United States Patent [19]
Giachello

[11] 3,796,899
[45] Mar. 12, 1974

[54] PERMANENT MAGNET SPEED DETECTOR
[75] Inventor: Marco Giachello, Turin, Italy
[73] Assignee: Fiat Societa Per Azioni, Turin, Italy
[22] Filed: July 27, 1972
[21] Appl. No.: 275,666

[30] Foreign Application Priority Data
Aug. 2, 1971  Italy ................................ 69596/71

[52] U.S. Cl. .................. 310/156, 310/168, 310/268
[51] Int. Cl. ........................................... H02k 21/12
[58] Field of Search .......... 310/168, 768, 156, 207, 310/111

[56] References Cited
UNITED STATES PATENTS
3,230,406  1/1966  Henry-Baudot ................. 310/268 X
3,678,311  7/1972  Mattingly ............................ 310/156
3,090,880  5/1963  Raymond ............................ 310/268

*Primary Examiner*—D. F. Duggan
*Attorney, Agent, or Firm*—Sughrue, Rothwell, Mion, Zinn & Macpeak

[57] ABSTRACT

This invention provides an improved magnetic angular speed detector in which an annular magnet having a number of magnetised sectors of alternate polarity rotates, with a member the speed of which is to be detected, relative to an annular coil formed with a number of loops, preferably as a printed circuit of zig-zag configuration. The circumferential width of the loops of the coil is equal to the circumferential spacing between like pole sectors of the annular magnet.

1 Claim, 5 Drawing Figures

PATENTED MAR 12 1974 3,796,899

PERMANENT MAGNET SPEED DETECTOR

BACKGROUND OF THE INVENTION

This invention relates to magnetic angular speed detectors, more particularly speed detectors having permanent magnets and arranged to generate electrical signals having a frequency, voltage and/or pulse width proportional to the rotational speed of a member such as a shaft.

Previously known angular speed detectors generally comprise a coil responsive to variations of a magnetic field associated with the rotating member to provide a voltage proportional to the speed of rotation of the member. In one known speed detector the coil is so placed as to detect variations in the magnetic field due to a permanent magnet rotating with the rotary member.

In such earlier known detectors the permanent magnet is magnetised in a generally radial direction with respect to the axis of rotation of the member with which it rotates, and in view of the inevitable irregularity and spreading of the magnetic field some inaccuracy is introduced and this, combined with any eccentricity in the mounting of the rotary member, gives rise to the possibility of errors in the detected signal. In view of this high accuracy is essential in the mounting of the stay member, and expensive bearings are necessary in order to avoid variation in the relative positions of the interacting parts of the speed detector due to wear of the bearings.

Moreover, this known detector suffers from the disadvantage that the detecting coil is affected at any given instant only by a small part of the magnetic field of the magnet, so that the electrical signal generated is necessarily small.

An object of this invention is, therefore, to provide an angular speed detector device of the permanent magnet type which is simple to manufacture, of low cost, and which is relatively insensitive to alignment inaccuracies between the parts, eccentricity or wear, and which generates speed signals with high efficiency.

Another object of the invention is to provide a simple process for the manufacture of the permanent magnet used in the angular speed detector.

SUMMARY OF THE INVENTION

According to the invention there is provided a magnetic annular speed detector device comprising a magnet arranged to rotate with a rotating member the speed of which is to be detected and an electrical winding relative to which the magnet rotates to induce a voltage in the winding as a result of the magnetic flux variations therein, wherein the improvement consists in that the magnet is formed by a number of sectors magnetised with alternate polarity and arranged in an annulus coaxially with the rotating member and in that the winding comprises a single annular coil constituted by a meandering zig-zag conductive path formed on an annular surface facing the magnetic annulus and coaxial therewith, the loops formed by the zig-zag path having a circumferential width equal to the circumferential spacing of adjacent sectoral pole pairs of said magnet.

The invention also provides a process for the manufacture of a speed detector device as aforesaid, said process including the steps of clamping the annular magnet, initially magnetised with a uniform magnetisation, relative to the annular coil, rotating the said magnet and the coil together, detecting the passage of successive loops of the annular coil past a fixed point, and inverting the magnetisation of the magnet by energising an electromagnet while one half of the circumferential width of each said loop passes said point, to effect the magnetisation of the annular magnet in sectors.

Alternatively, the process may comprise rotating the annular magnet, initially magnetised with a uniform magnetisation, and subjecting said annular magnet to an alternating magnetic field at a frequency equal to an integral multiple of the frequency of rotation of the annular magnet so as to achieve magnetised sectors of alternate polarity and of the desired circumferential width.

BRIEF DESCRIPTION OF THE DRAWINGS

A preferred practical embodiment will now be described, merely by way of example, with reference to the accompanying drawings, wherein:

FIG. 1 shows disgrammatically in axial section a speed detector device according to this invention in which a chassis of a car or other vehicle constitutes a fixed support 10 and carries an annular disc 12 of non-magnetic material, for example a synthetic material. On its face remote from the support 10 the disc 12 carries a thin annular plate 14 formed of a material of low magnetic reluctance, for example of sintered steel or ferrite. To the plate 14 there is applied a further annular plate 16 of insulating material which carries a printed circuit (not shown in FIG. 1) on its face 17 remote from the plate 14. This printed circuit will be described further with reference to FIG. 2.

Figure 1:
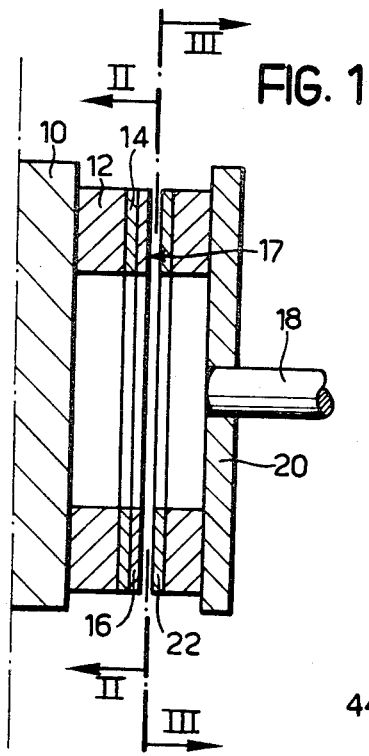
FIG. 1 is a diagrammatic axial sectional view of an angular speed detector device according to one embodiment of the invention.

A rotating member 18 of which the angular speed is to be detected carries at an end adjacent the fixed support 10 a supporting disc 20 to which an annular permanent magnet 22 is attached. The annular magnet 22 is formed of plasto ferrite material, magnetised as described later with reference to FIG. 3. The annular plate 16 and the annular magnet 22 have substantially equal inner and outer radii and are mounted coaxially with each other.

Figure 2:
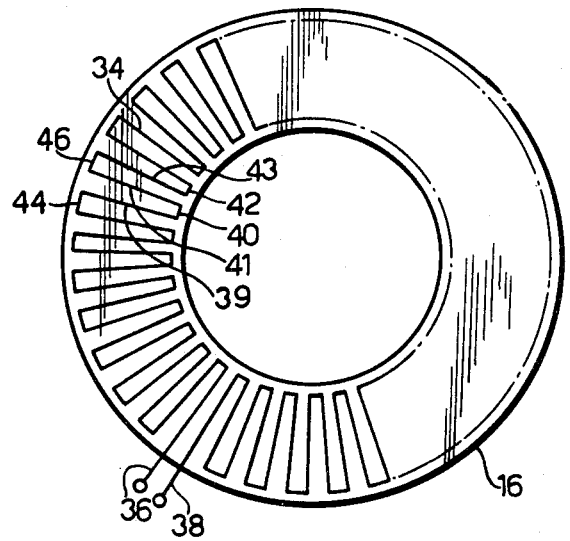
FIG. 2 is a cross-sectional view in the direction of the arrows II—II of the speed detector device of FIG. 1.

FIG. 2 shows diagrammatically part of the printed circuit carried by the annular plate 16. This printed circuit is formed by a continuous meandering or zig-zag conductive track 34 on the face 17 of the plate 16, the opposite ends of the track 34 being provided with terminals 36 and 38 located adjacent each other. The track 34 has, therefore, radially extending conductive parts 39, 41, 43, . . . which are alternately interconnected at their radially inner and radially outer ends by short circumferentially extending conductive parts 40, 42, . . . and 44, 46, . . . respectively. The pitch of the zig-zag track 34, or the mean distance between corresponding radial parts of the track, such as 39 and 43, is uniform for the entire annular track.

Figure 3:
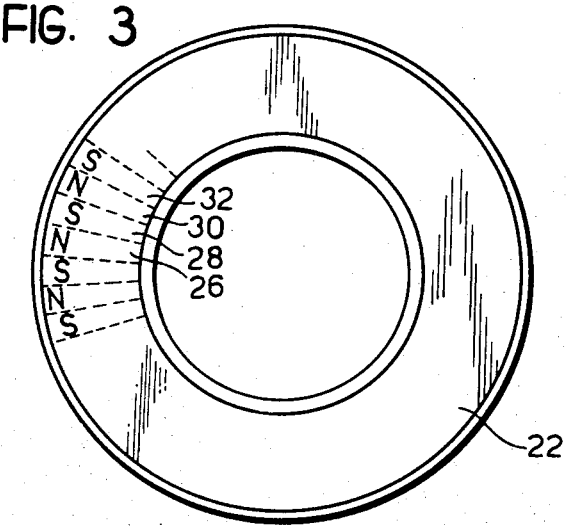
FIG. 3 is a cross-sectional view in direction of the arrows III—III of the speed detector device of FIG. 1.

With reference to FIG. 3, the annular magnet 22 is magnetised in a direction parallel to its axis, in a number of sectors 26, 28, 30, 32, . . . of alternate polarity. The mean circumferential width of each sector is equal to half the pitch of the zig-zag track 34 on the annular plate 16.

Consequently, when the annular magnet 22 and the zig-zag track 34 are counterposed in axial alignment, as shown in FIG. 1, the substantially axial magnetic field produced by the magnet 22 and linked with the track 34 will vary between two maxima of opposite polarity (north, N and south, S). Thus supposing one sector 26 of north magnetism (N) is directly opposite to the area delimited by the track parts 41, 46, 43 on the inside of the track 34, then sectors of North polarity (N) will also be located directly opposite all the other analogous areas of the track 34, while the sectors of south polarity (S) will be located opposite areas which are on the outside of the zig-zag track 34. By rotating the magnet 22 with respect to the track 34 through one half-pitch of the track 34 the opposite situation will result, in which all the South poles (S) will, in effect, be inside the track 34 and all the North poles (N) will be outside the track 34.

It will be seen, therefore, that by rotating the shaft 18 with respect to the fixed support 10, the magnetic flux of the annular magnet 22 links with the zig-zag track 34 and the frequency of the variation of the flux linkage, and, therefore, the induced voltage in the track 34, is proportional to the rotational speed of the shaft 18.

By using a material of high remanence for the annular magnet 22, such as a plasto-ferrite, and a material of low reluctance for the annular support plate 14 of the printed circuit it is ensured that the lines of the magnetic field due to the magnet 22 are directed substantially perpendicular to the plane of the track 34, with only slight spreading or divergence of the field direction.

By making use of an axially directed magnetic field as compared with a radially directed field, and by arranging that at each instant the whole surface of the annular magnet 22 co-operates with the track 34, the electromotive force induced between the terminals 36 and 38, being the sum of the electro-motive forces induced in each single loop of the track, is significantly higher than in earlier known devices of this kind. As a result the detector according to this invention is relatively insensitive to eccentricity, misalignment or other variations of relative positioning of the relatively moving parts.

For example, the case will be considered where there is a slight inclination and axial misalignment of the plane of the magnet 22 with respect to the plane of the track 34. The magnetic flux linked with the track 34 in the zone in which the distance between the magnet and the track is at a maximum will be reduced, and the flux linking the diametrically opposite zone of the track will be increased. Since, however, the electro-motive force generated at the output terminals 36, 38 of the track is, as stated previously, given by the sum of the electromotive forces generated in each loop of the track over the whole circumferential extent of the track, the resultant voltage across the terminals 36, 38 will not be subject to periodic fluctuations as the shaft 18 rotates through 360°.

The insensitivity of the device to positioning errors is due also to the substantial linearity of the magnetic field lines, which remain perpendicular both to the magnet 22 and to the track 34, that is, parallel to the common axis of the magnet 22 and the annular plates 14 and 16. This allows manufacture of the device with ample tolerance both in the relative positioning of the axes of the relatively moving parts 14, 22, and in the spacing between the magnet 22 and the track 34. Moreover, the said insensitivity also allows the use of rotational supports of low cost since considerable wear of the supports can be tolerated before the detector device becomes unusable.

In fact the only constructional aspect in which a high degree of dimensional precision is required is in the exact correspondence required between the spacing of the polar sectors of the annular magnet 22 and the spacing of the loops of the track 34. To achieve such exact correspondence, this invention also provides a simple process of an apparatus for the sectoral magnetisation of the annular magnet 22, which facilitates the manufacture quickly and at low cost of annular magnets individually magnetised to correspond to respective printed circuits on respective annular plates 16.

MAGNETISATION OF THE ANNULAR MAGNET

Figure 4:
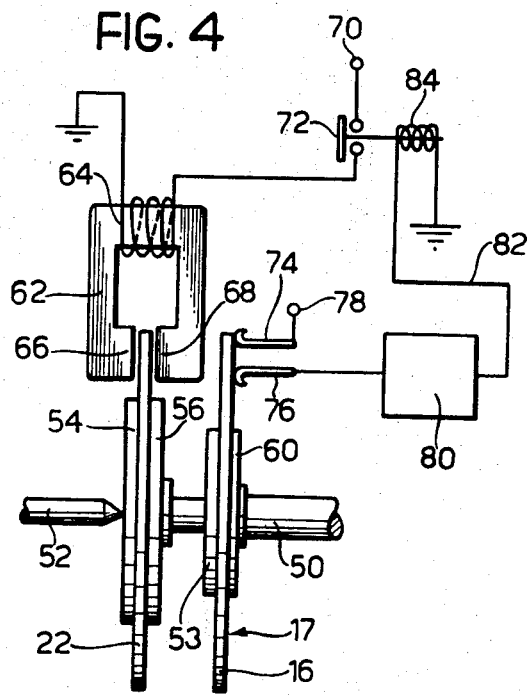
FIG. 4 is a schematic drawing of an apparatus for carrying out a process for manufacturing the permanent magnet of the speed detector device as shown in FIG. 2, according to another aspect of the invention.

Referring to FIG. 4, the annular magnet 22, uniformly magnetised in an axial direction, and the annular plate 16 carrying a printed circuit in the form of the conductive zig-zag track 34 on the face 17 are mounted coaxially and non-rotatably on respective supports shown diagrammatically as comprising a rotary mandrel 50 and a counterpoint 52. The annular magnet 22 and the printed circuit plate 16 are suitable clamped between respective pairs of rigid discs 54, 56, and 58, 60.

An electro-magnet 62 having a magnetising coil 64 is provided with two polepieces 66, 68 the faces of which are parallel to each other and elongated radially with respect to the axis of the annular magnet 22. The circumferential width of the polepieces 66 and 68, in a direction perpendicular to the plane of FIG. 4, is slightly smaller than the desired circumferential width of the pole sectors of the annular magnet.

The coil 64 of the electro-magnet 62 can be connected to a direct current source 70, of high power, through a relay switch 72. The magnitude of the current which fed to the coil 64 is so calculated that the magnetic field generated between the polepieces 66, 68 when the relay switch 72 is closed is sufficient to invert completely the magnetisation of the annular magnet 22 in the zone of the latter included between the polepieces.

Two sliding contacts 74, 76, aligned on a common radius with respect to the common axis of the magnet 22 and of the annular plate 16, are disposed in a fixed position and in contact with the face 17 of the plate 16 on which the printed circuit track 34 is provided. The contact 74 is connected to a direct current supply 78, while the contact 76 is connected to the input of a bistable multivibrator 80, having a single input, to cause commutation of the multivibrator each time a circuit is completed between the contacts 74 and 76, that is, when a radial part of the track 34 is located between the contacts. The output line 82 of the bistable multivibrator 80 is connected to and controls the energisation of the winding 84 of the relay switch 72.

To magnetise the annular magnet 22, the mandrel 50 is rotated, causing rotation of both the printed circuit plate 16 and the magnet 22 itself. It will be supposed that initially the output voltage of the bistable multivibrator 80 on the line 82 is zero: the relay switch 72 is therefore open, and the magnetisation of the sector of the magnet 22 between the polepieces 66 and 68 will therefore remain unchanged.

As soon as the contacts 74 and 76 engage a radial part of one of the turns of the zig-zag track 34, commutation of the bistable multivibrator 80 occurs, causing an energising voltage to be applied to the relay winding 84, and thereby closing the relay switch 72. The polepieces 66 and 68 now create in the sector of the magnet located therebetween an instantaneous magnetic induction which inverts the magnetisation of the magnet 22 in said sector. This reversing magnetic induction is maintained after the two contacts 74 and 76 have ceased to make contact with the said radial part of the track 34: the bistable multi-vibrator 80 is returned to its initial state when the two contacts engage the next adjacent radial part of the track 34, whereupon the relay switch 72 reopens, switching off the magnetic field generated by the electro-magnet 62, so that the next following sector of the annular magnet 22 will have its initial magnetisation left unchanged.

It will be apparent that, when the mandrel 50 has performed one complete rotation of 360°, the annular magnet 22 will be magnetised in a number of polar sectors of alternate polarity, the angular distribution and circumferential width of the sectors corresponding exactly with the annular zig-zag printed circuit path 34 on the plate 16.

Naturally the rotational speed of the mandrel should be sufficiently low to ensure that the effects of the magnetisation transitions and the frictional drag of the magnetic field generated by the electro-magnet 62 on the annular magnet 22 do not reach such a magnitude as to cause anomalies in the regularity of the magnetisation.

Figure 5:
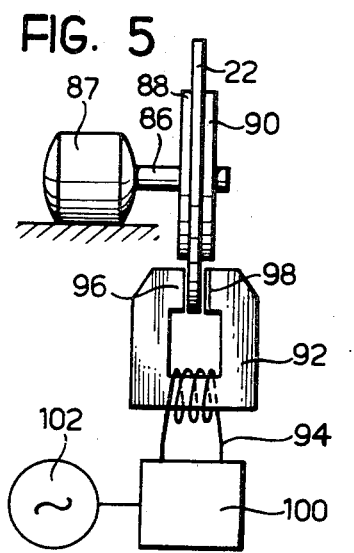
FIG. 5 is a schematic drawing of another apparatus for magnetising the said permanent magnet by a process according to the invention.

The technique and apparatus illustrated in FIG. 5 therefore enables the annular magnet to be made simply and economically with accurate reference to the annular zig-zag track 34 on the annular plate 16.

FIG. 5 illustrates schematically an apparatus for effecting the sectoral magnetisation of the annular magnet 22 by means of a different method. An annular plastoferrite plate 22, permanently magnetised in an axial direction, is fixed to a shaft 86 of a synchronous electric motor 87 by means of two discs 88, 90 clamped on opposite faces of the plate 22. An electromagnet 92 having a magnetising winding 94 has two parallel radially elongated pole faces 96, 98 the circumferential width of which is negligible compared with the circumferential width of the desired magnetised sectors. The annular plate 22 is located between the pole faces 96, 98 and the winding 94 is energised by a power amplifier 100 which amplifies an oscillatory voltage provided by an oscillator 102, of any suitable type, but of high stability.

To effect sectoral magnetisation of the annular magnet 22, the motor 87 is rotated at a low angular speed $n$, while the oscillator 102 provides a sinusoidal output signal of frequency $f$ (in the same units of measurement as the angular speed $n$) such as to satisfy the relation:

$$f = kn,$$

where $k$ is a whole number, equal to the required number of pole pairs on the annular magnet 22. The electro-magnet 92 imparts the requisite sinusoidal magnetisation to the ring 22, with a wavelength, or pitch, measured circumferentially, equal to the distance between like pole segments on the resulting magnet 22.

The requisites for correct functioning of the apparatus of FIG. 5 are perfect stability both of the rotational speed of the shaft 86 and of the frequency of the signal generated by the oscillator 102, and, moreover, precise control of the relation between these two quantities. In particular, the power of the motor 87 must be such that the rotational movement of the annular magnet 22 is not affected appreciably by variations of frictional couples imposed on the magnet by the magnetic field due to the electro-magnet 92, during rotation of the magnet 22.

Naturally, both the angular speed detector device herein described, and the process and apparatus for the magnetisation of the annular permanent magnet 22, are given herein merely by way of example, and it will be appreciated that numerous variations are possible both in the structure of the detector device and in the magnetisation process. For example, the permanent magnet 22 could be made in a material other than plastoferrite, and could also be of composite construction, obtained by placing side-by-side a number of elementary sector-shaped magnets, even though in practice such a manufacturing technique is less advantageous than that described herein. Also the conductive zig-zag track 34, instead of being a printed circuit, could be formed by a conductive strip or wire folded into the requisite shape.

It would also be possible, within the scope of this invention, to form the annular magnet 22 by different methods.

I claim:

1. A vehicle having a chassis constituting a fixed support of the vehicle, a member rotatable with respect to said support, and means, mounted part on said chassis and part on said rotating member, to provide an electrical signal proportional to the speed of rotation of the member with respect to said support, wherein the part of said means mounted on the chassis comprises an annular disc of non-magnetic material fixed to said chassis, a first annular plate of material of low magnetic reluctance secured to the face of said disc remote from said support, a second annular plate of insulating material secured to said first plate and carrying a printed circuit remote from the first plate, said printed circuit being formed by a continuous conductive zigzag track having a plurality of equally spaced radially extending parts alternately connected at the radially inner and outer ends by circumferentially extending parts, the pitch of the zig-zag track being uniform and there being provided adjacent output terminals at the opposite ends of the track, said disc and said plates being mounted coaxially with said rotating member, and wherein the part of said means fixed to said rotating member adjacent to the fixed support, and an annular magnet mounted on said supporting disc coaxially with the rotating member and counterposed to said track, said second plate and said magnet having substantially equal inner and outer radii and said magnet being formed of a number of radially extending sectors magnetized in a sense parallel to the axis of the rotating member, the individual sectors having a mean circumferential width equal to half the pitch of the zig-zag track with adjacent sectors being of opposite polarity.

\* \* \* \* \*